Patented Aug. 13, 1935

2,011,428

UNITED STATES PATENT OFFICE 2,011,428

LIGHT STABLE INSECTICIDE

Vanderveer Voorhees, Hammond, Ind., assignor to Standard Oil Company, Chicago, Ill., a corporation of Indiana No Drawing. Application May 4, 1931, Serial No. 535,093

12 Claims. (Cl. 167—24)

This invention relates to a light stable insecticide and particularly to a light stable insecticidal and fungicidal composition which is adapted to form emulsions for use in spraying trees, vegetables, flowers and other forms of vegetation.

The composition comprises a mineral oil containing the active ingredients of pyrethrum or any other light-sensitive insecticidal or fungicidal agent, an emulsifying agent and a light-screening agent. Also other compounds may be added to the composition for various purposes such as preservatives or antioxidants.

Several types of oil emulsions containing pyrethrum extract, or other insecticidal and fungicidal agents, have been prepared for use in spraying various forms of vegetation, but when such emulsions are sprayed on plants exposed to direct sunlight, or artificial light which contains actinic rays, the sensitive organic insecticidal and fungicidal agents rapidly become inert and thereupon the beneficial effect of the sprayed material is lost.

When such plant-sprays are used in hothouses or upon plants that receive sunlight through some screening medium, such as ordinary window glass, the active principles of the spray are not affected by the screened light. When the same spray is applied to plants exposed to direct sunlight, or artificial sunlight, the active principles of the spray rapidly become inactive and the spray suffers a serious reduction in insecticidal and fungicidal power.

I have found that certain light-screening agents or photo-desensitizers may be added to plant sprays and thereby the sunlight is prevented from altering or rendering inert the active principles of the spray. The compounds used to accomplish this result usually show an absorption band in the actinic regions. Light stable, oil soluble dyes have proved successful as light-screening or light-protecting agents to protect the active principles of anti-parasitic sprays. On the other hand, certain entirely colorless compounds such as anthracene and its homologues and isologues impart no color to the solution, but are nevertheless effective as photo-desensitizers.

Furthermore, it appears that the photo-desensitizers not only prolong the life of the insecticidal ingredient but also stabilize the oil component of the spray against undesirable chemical changes and thereby reduce or prevent toxic effects on green foliage plants for which these sprays are particularly adapted.

I have found that derivatives of anthraquinone are light stable, oil soluble and very suitable for the purposes of this invention. Also anthracene, anthracene derivatives and highly condensed aromatic ring compounds in general are suitable. Anthraquinone compounds of the following general formula have proved satisfactory for the purposes of this invention:

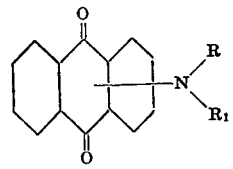

R and $R_1$ represent hydrogen or any organic residue. Also di-amino and substituted di-amino anthraquinones may be used. The nucleus of the anthraquinone and the organic residue may be substituted with alkyl, aryl, aralkyl, nitro, hydroxyl and other groups. The above class of anthraquinone compounds include phenylated amino anthraquinone, oxyphenyl amino anthraquinones, alkyl phenyl amino anthraquinones, diarylamino anthraquinones, 1,4 toluido anthraquinone and aryl diamino anthraquinones.

These light-screening and protecting agents may be used with any insecticidal and fungicidal composition but their greatest usefulness is in combination with phytonomic oils such as the highly refined mineral white oils. A suitable composition is preferably made up as a concentrated emulsion with a small amount of water so that on merely diluting with water a suitable spray emulsion is obtainable. For this purpose, the following ingredients may be used in the composition:

Emulsifying agent
Preserving agent
Water
Oil containing an insecticidal or fungicidal agent
Light-screening agent The oil solution may be prepared by extracting pulverized pyrethrum flowers or alternatively, by extracting any substance that yields a light-sensitive oil soluble substance exhibiting insecticidal and fungicidal agents. Also sensitive insecticidal and fungicidal agents from any source may be dissolved in the oil.

As indicated above the oil is preferably a purified mineral oil or white oil, such as is obtained by treating viscous mineral oils with sulfuric acid until all phytocidal ingredients have been removed. The oil may suitably have a viscosity of from 60 seconds Saybolt to 380 seconds Saybolt (at 100° F.) or higher, but preferably of about 75 seconds to 100 seconds.

Various water soluble emulsifying agents of the gum type may be used, such as glue, dextrin, gum tragacanth, gum arabic, gum ghatti, or the like.

As a preservative it is preferred to use cresylic acid in small quantities. Other preservatives may be employed, such as formaldehyde, wood creosote or ferrous sulphate.

The amount of the photo-desensitizer required is usually very small, and generally between 0.001% and 0.1%, although somewhat larger quantities may be used in certain cases.

The following specific example of a concentrated emulsion suitable for dilution to yield an insecticidal or fungicidal spray is as follows:

|  | Per cent |
| --- | --- |
| Gum ghatti | 2.4 |
| Cresylic acid | 0.18 |
| Water | 35 |
| White oil (80 seconds Saybolt at 100° F.) | 62.4 |
| 1,4 toluido anthraquinone | 0.02 |

The concentrated emulsion may be prepared by intimately mixing the ingredients in a colloid mill or by passing the mixture through a centrifugal pump or in any other suitable manner to give a concentrated emulsifiable composition which may readily be diluted to yield an emulsion suitable for spraying purposes.

The use of a screening agent has been described in connection with a specific insecticidal composition, but it should be appreciated that screening agents may be added to any kind of insecticidal or fungicidal agent that is affected by sunlight.

I claim:

1. A composition capable of forming an emulsion with water and effective as an anti-parasitic spray for plants, comprising a mineral oil, the oil soluble extract of pyrethrum and a substituted amino anthraquinone.

2. A composition capable of forming an emulsion with water and effective as an anti-parasitic spray for plants, comprising an emulsifiable pyrethrum composition and a substituted diamino anthraquinone for protecting the insecticidal composition from actinic light rays.

3. A method for making pyrethrum extract solutions stable when sprayed on plants and exposed to actinic light which comprises adding to the solution a compound of the general formula:

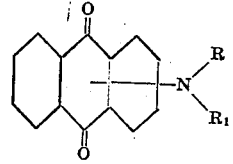

R and $R_1$ represent alkyl or aryl groups, or hydrogen.

4. A composition capable of forming an emulsion with water and effective as an anti-parasitic spray for plants, comprising an emulsifiable pyrethrum extract composition and a di-amino anthraquinone compound for protecting the insecticidal composition from actinic light rays.

5. A method for making oil soluble pyrethrum extracts light stable which comprises adding an amino anthraquinone compound.

6. An insecticidal and fungicidal composition comprising the active principles of pyrethrum and an amino anthraquinone compound.

7. An insecticidal and fungicidal composition comprising the active principles of pyrethrum and anthracene.

8. An insecticidal and fungicidal composition containing pyrethrum and a light screening agent of the general formula

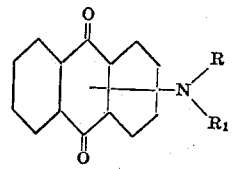

wherein R and $R_1$ represent alkyl or aryl groups, or hydrogen.

9. An insecticidal and fungicidal composition comprising a mineral oil, pyrethrum, and a light-screening oil soluble organic compound selected from the class consisting of an amino anthraquinone compound and anthracene.

10. An insecticidal and fungicidal composition comprising a light mineral oil, an organic insecticide having the light sensitive characteristics of pyrethrum and which tends to lose its toxicity in the presence of light, and a small proportion of a light-screening oil soluble organic compound selected from the class consisting of amino anthraquinones and anthracene.

11. An insecticidal and fungicidal composition comprising a mineral oil, an oil soluble organic insecticide of vegetable origin which tends to lose its toxicity in the presence of light, and a light-screening oil soluble organic compound selected from the class consisting of amino anthraquinones.

12. An insecticidal and fungicidal composition comprising the active principles of pyrethrum and from 0.001 to 0.1% of 1,4 toluido anthraquinone.

VANDERVEER VOORHEES.